United States Patent Office 3,766,220
Patented Oct. 16, 1973

3,766,220
EPOXIDIZED ESTERS OF 5-OXAALKENOIC ACIDS
Vaclav Jarolim, Lyckovon. 9, Prague-Karlin, Czechoslovakia; and Karel Slama, 674 Na cervenem vrchu; and Frantisek Sorm, 9 Korejska, both of 6 Prague, Czechoslovakia
No Drawing. Filed Mar. 24, 1971, Ser. No. 127,813
Int. Cl. C07d 1/22
U.S. Cl. 260—348 A      4 Claims

ABSTRACT OF THE DISCLOSURE

Novel esters of 5-oxa-alkenoic acids possessing insect juvenile hormone activity prepared from an oxa-ketone by Wittig reaction, Emmons-Wadworth reaction or Reformatsky reaction followed by dehydration.

In recent time, a number of substances has been discovered possessing the juvenile hormone activity, namely, stimulating the insect larval development, interfering with the metamorphosis of larvae, and influencing the ovarian growth in adult females. Majority of these compounds possess a farnesane or bisabolane skeleton, e.g., farnesol, 10,11-epoxyfarnesoic acid methyl ester, esters of dihydrodichlorofarnesoic acid, juvabione, dehydrojuvabione, and derivatives of p-(1,5-dimethylhexyl) benzoic acid.

The present invention relates to novel substances possessing the insect juvenile hormone activity, namely, esters of 5-oxaalkenoic acids according to the Formula I and the preparation thereof.

$$R^5-(A)-CH_2-CH_2-\underset{\underset{Z^2}{|}}{C}-\underset{\underset{Z^1}{|}}{\overset{CH_2R^3}{C}}-CH-CH_2-O-CH_2-(B)-\overset{O}{\overset{\|}{C}}-OR^1 \quad (I)$$

wherein,

B is one of the groups $$-\underset{}{\overset{CH_2R^2}{C}}=CH-,\quad -\underset{\underset{R^6}{|}}{\overset{CH_2R^2}{C}}=C-,\quad \text{or}\quad -\underset{\underset{R^6}{|}}{\overset{CHR^2}{C}}-CH-$$

A is one of the groups $$-CH_2-\underset{\underset{Z^4}{|}}{\overset{CH_2R^4}{C}}-CH-\quad \text{or}\quad -CH_2-\underset{\underset{Z^4}{|}}{\overset{Z^5-CHR^4}{C}}-CH_2-$$

R¹ is hydrogen, lower alkyl, lower alkenyl, cycoalkyl or aralkyl;
each of R², R³, R⁴, R⁵ and R⁶ is hydrogen, lower alkyl of 1 to 5 carbon atoms, or lower alkylidene of 1 t o 5 carbon atoms;
Z¹ is hydrogen;
Z² is hydrogen, bromo, chloro, fluoro, or, taken with Z¹, a carbon-carbon bond or oxido;
Z³ is hydrogen;
Z⁴ is hydrogen, bromo, chloro, fluoro, or, taken with Z³, a carbon-carbon bond or oxido; and
Z⁵ is hydrogen, or, taken with Z⁴, a carbon-carbon bond or oxido.

The compounds of Formula I are useful for the control of insects. The compounds are applied using either liquid or solid carries, such as water, acetone, cottonseed oil, xylene, mineral oil, silicon, talc, natural and synthetic resins, and the like. Generally, compositions for application will contain up to about 75% of the active compound and more usually less than 25% sufficient composition should be applied to provide from about 0.1 to 25 micrograms of the active compound per insect. Typical insects controlled by the present invention are Diptera, such as mosquitos and houseflies; Hemiptera, such as Pyrrhocoridae and Miridae; Coleoptera; and Dermestidae. For example, *Pyrrhocoris apterus, Lygus hesperus, Triboleum confusm, Diabrotica duodecimpunctata, Aedes aegypti* and *Musca domestica*. Without any intention of being bound by theory, the compounds of Formula I are believed to be effective by reason of hormonal action in that unlike conventional insecticides which are effective by reason of causing immediate death, the compounds of Formula I are effective by reason of physiological changes caused in the treated insect which result in eventual death of the insect and/or inability of the treated insect to reproduce by reason of sterility or abnormal development.

The term "cycloalkyl," as used herein, refers to a cyclic alkyl group of four to eight carbon atoms. The term "aralkyl" refers to a monovalent group in which an aryl group is substituted for a hydrogen atom of an alkyl group, such as benzyl, xylyl, mesityl, phenylethyl, methylbenzyl, naphthylmethyl and naphthylethyl. The term "lower alkyl," as used herein, refers to a straight or branched chain saturated aliphatic hydrocarbon group having a chain length of one to six carbon atoms. The term "lower alkenyl," as used herein, refers to an ethylenically unsaturated hydrocarbon, branched or straight chain, having a chain length of two to six carbon atoms such as alkyl, vinyl, 3-butenyl, 2-butenyl, 2-hexenyl and isopropenyl.

The novel substances of the present invention, including isomers and intermediates, are prepared by the action of diazomethane on the acyl chloride according to Formula III, thus forming the diazoketone $$\underset{}{\overset{R^2}{\underset{|}{CH_2}-COCl}} \quad (III) \qquad \underset{}{\overset{R^2}{\underset{|}{CH_2}-CO-CHN_2}} \quad (IV)$$

according to Formula IV, subjecting the latter to a rearrangement in the presence of an acid catalyst, e.g., boron trifluoride, and in an excess of an alcohol possessing the suitable number of carbon atoms, according to Formula V $$R^5-[A]-CH_2-CH_2-\underset{\underset{Z^2}{|}}{C}-\underset{\underset{Z^1}{|}}{\overset{CH_3-R^3}{C}}-CH-CH_2-OH \quad (V)$$

thus forming the keto ether according to Formula VI $$R^5-[A]-CH_2-CH_2-\underset{\underset{Z^2}{|}}{\overset{CH_2-R^3}{C}}-\underset{\underset{Z^1}{|}}{C}-CH-CH_2-O-CH_2-\overset{CH_2-R^2}{\overset{|}{C}}=O \quad (VI)$$

subjecting the keto ether to Wittig reaction with alkoxycarbonylmethylenetriphenylphosphorane, thus forming the corresponding ester of 5-oxaalkenoic acid I, which is either separated into the individual isomers or subjected to the addition of a hydrogen halide to the double bond or to an epoxidation, thus forming the ester of the corresponding halo- or epoxy-5-oxaalkenoic acid.

Ethyl 5 - oxa - 3,8,12 - trimethyl-2,11-tridecadienoate II may serve as a specific example $$\underset{13\ \ 12\ 11}{CH_3}-\underset{10}{\overset{CH_3}{\underset{|}{C}}=CH}-\underset{9}{CH_2}-\underset{8}{CH_2}-\underset{7}{\overset{CH_3}{\underset{|}{C}H}}-\underset{6}{CH_2}-\underset{5}{CH_2}-\underset{4}{O}-\underset{3}{CH_2}-\underset{2}{\overset{CH_3}{\underset{|}{C}}=CH}-\underset{1}{COOC_2H_5}$$

(II)

The process of preparing the novel esters according to Formula I is illustrated by the following Scheme.

The steps of the preparation of the novel substances according to the present invention are advantageously performed under the following reaction conditions.

(1) The reaction with alkoxycarbonylmethylenetriphenylphosphoranes (Wittig reaction) is performed in an inert solvent (preferably in benzene or toluene), in an inert atmosphere (nitrogen), and in the presence of a catalyst (preferably benzoic acid).

(2) Addition of hydrogen halides to the double bond of 5-oxaalkenoic acids or their esters (I) is performed in an inert solvent, preferably in ether, methanol, or ethanol.

(3) Epoxidation of the double bond of the product I is performed preferably in ether or chloroform by the action of organic peracids, e.g., perbenzoic acid, perphthalic acid, or m-chloroperbenzoic acid.

(4) Mixtures of cis- and trans-isomers of the esters of 5-oxaalkenoic acids can be separated by fractional distillation, adsorption chromatography over silica gel, gas chromatography, or by a combination of these methods.

SCHEME OF THE PREPARATION

The symbol [A] designates the same as above except for the absence of the halo atom or the epoxide grouping. $Z^1=Z^2=H$ or $-C=C-$.

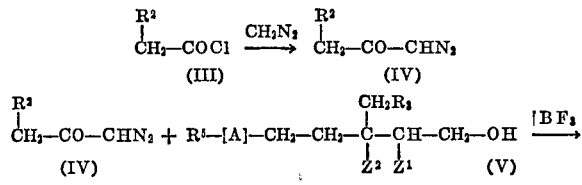

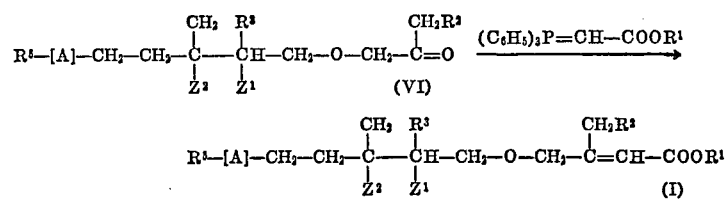

Another method of preparation is to subject the keto ether VI to treatment with an ester of alkoxycarbonylmethanephosphonic acid, thereby forming the corresponding ester of 5-oxaalkenoic acid I. The reaction is performed preferably in dimethylformamide or dimethylcellosolve in an inert atmosphere, e.g., under nitrogen, in the presence of base such as sodium methoxide or sodium hydride.

Another method of preparation comprises treating the keto ether VI with an appropriate ester of an α-halocarboxylic acid having 2 to 4 carbon atoms in the presence of active zinc, thereby forming the β-hydroxy ester VII and subjecting the latter to dehydration, e.g., with phosphorus oxychloride in pyridine, to form the ester of 5-oxaalkenoic acid I. This embodiment is outlined as follows and is useful for preparation of the compounds of Formula I containing $R^6$.

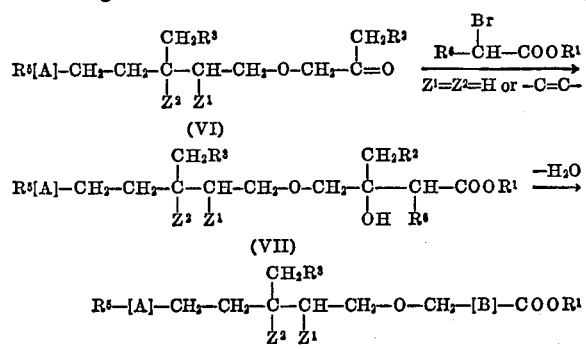

The symbol [A] represents the same as above except for the absence of a halo atom or the epoxide group The process of preparing novel substances according to the above outlined embodiment is performed preferably under the following reaction conditions:

(1) The Reformatsky reaction is performed in inert solvents (ethers, hydrocarbons), preferably in benzene or toluene.

(2) The dehydration of β-hydroxy esters VII (obtained by the Reformatsky synthesis) is performed with dehydration agents such as p-toluenesulfonic acid, potassium hydrogen sulfate, or preferably with phosphorus oxychloride in pyridine.

The present invention is illustrated by the following examples but is not limited thereto. Temperature is given in degrees centigrade.

Example 1

Preparation of 4 - oxa - 7,11-dimethyl-10-dodecen-2-one: Acetyl chloride (5 g.; 0.64 mol) in absolute ether (10 ml.) is added dropwise under stirring to an ethereal solution of diazomethane (8.1 g.; 0.192 mol) precooled to —15°. The reaction mixture is allowed to stand for about one hour; the temperature spontaneously raises to 0°. At this temperature, the ether is distilled off the mixture in vacuo of a water pump. The resulting diazo ketone is dissolved in citronellol (20 g.; 0.128 mol) and treated (under cooling with water) with boron trifluoride etherate (0.2 ml.). After mixing, nitrogen is evolved and temperature raises. The reaction is finished when the vigorous evolution of gas has ceased. The reaction mixture is diluted with ether (100 ml.), washed with an aqueous solution of sodium hydrogen carbonate and water until neutral, evaporated to remove ether, and the residue subjected to fractional distillation. The fraction boiling at 135–145° C./10 mm. Hg and containing the crude keto ether is purified by chromatography over silica gel with the use of petroleum ether—ether (9:1) as eluant. Yield, 4.4 g. of pure 4-oxa-7,11-dimethyl-10-dodecen-2-one.

Preparation of 5 - oxa - 8,12 - dimethyl-11-tridecen-3-one: With the use of the above mentioned procedure and diazomethane (8.1 g.), propionyl chloride (5.9 g.), and citronellol (20 g.) as reactants, 5 g. of 5-oxa-8,12-dimethyl-11-tridecen-3-one is obtained and purified by chromatography over silica gel.

The structures of the above mentioned products were confirmed by infrared and nuclear magnetic resonance spectra.

The above procedure was used to prepare the following keto ethers under column I:

(I)

4-oxa-7,11-dimethyldodecan-2-one,
4-oxa-7,11-dimethyl-6,10-dodecadien-2-one,
4-oxa-7,11-dimethyltridecan-2-one,
4-oxa-7,11-dimethyl-10-tridecen-2-one,
4-oxa-7,11-dimethyl-6,10-tridecadien-2-one,
4-oxa-7,11-dimethyl-11-tridecen-2-one,
4-oxa-7,11-dimethyl-6,11-tridecadien-2-one,
4-oxa-7-ethyl-11-methyltridecan-2-one,
4-oxa-7-ethyl-11-methyl-10-tridecen-2-one,
4-oxa-7-ethyl-11-methyl-6,10-tridencadien-2-one,
4-oxa-7-ethyl-11-methyl-11-tridecen-2-one,
4-oxa-7-ethyl-11-tridecen-2-one,
4-oxa-7-ethyl-11-methyl-6,11-tridecadien-2-one,
4-oxa-7,11,15-trimethylhexadecan-2-one,
4-oxa-7,11,15-trimethyl-6,14-hexadien-2-one,
4-oxa-7,11,15-trimethyl-6-hexadecen-2-one,
4-oxa-7,11,15-trimethyl-6,10,14-hexadecatrien-2-one,
5-oxa-8,12-dimethyltridecan-3-one,
5-oxa-8,12-dimethyl-7,11-tridadien-3-one,
5-oxa-8,12,16-trimethyl-7,11,15-heptadecatrien-3-one.

Example 2

Preparation of ethyl 5-oxa-3,8,12-trimethyl-2,11-tridecadienoate (II). A mixture of 4-oxa-7,11-dimethyl-10-dodecen-2-one (3.4 g.; 0.016 mol), ethoxycarbonylmethylenetriphenylphosphorane (6 g.; 0.017 mol), benzoic acid (0.7 g.), and absolute benzene (35 ml.) is gently refluxed in an atmosphere of nitrogen under exclusion of moisture for 10 hours. The benzene is evaporated and the semisolid residue is extracted with four 25-ml. portions of petroleum ether. The extracts are combined, washed with an aqueous solution of sodium hydrogen carbonate and water until neutral, and evaporated to remove petroleum ether. Distillation of the crude product at 115–120° C./0.01 mm. Hg affords a mixture of cis- and trans-isomers of ethyl 5-oxa-3,8,12-trimethyl-2,11-tridecadienoate (4.0 g.) which is separated by chromatography on silica gel or by gas chromatography. The structure of the substance was confirmed by means of infrared and nuclear magnetic resonance spectra, and elemental analysis.

Example 3

Preparation of 5-oxa-3,8,12-trimethyl-2,11-tridecadien-1-oic acid: A mixture of ethyl 5-oxa-3,8,12-trimethyl-2,11-tridecadien-1-oate (200 mg.) and 1% alcoholic potassium hydroxide (10 ml.) was gently refluxed for 1 hour, diluted with water (10 ml.), and evaporated to remove the alcohol. The alkaline reaction mixture is washed with ether and acidified with sulfuric acid. The liberated organic acid is extracted with ether, the ethereal extract is washed with water, dried, and the ether is evaporated. Yield, 180 mg. of 5-oxa-2,8,12-trimethyl-2,11-tridecadien-1-oic acid, a liquid.

Example 4

Preparation of benzyl 5-oxa-3,8,12-trimethyl-2,7,11-tridecatrien-1-oate: A mixture of methyl 5-oxa-3,8-trimethyl-2,7,11-tridecatrien-1-oate (250 mg.), benzyl alcohol (2 ml.), aluminum tert-butoxide (50 mg.) hydroquinone (100 mg.), and absolute benzene (20 ml.) is gently refluxed under nitrogen for 20 hours. The mixture is diluted with water, acidified with aqueous sulfuric acid, and extracted with ether. The extract is washed with aqueous 1% sodium hydroxide and water until neutral, and the solvent is evaporated. The resulting mixture is chromatographed over silica gel with the use of petroleum ether-ether (9:1) as eluant. Yield, 200 mg. of benzyl 5 - oxa - 3,8,12 - trimethyl-2,7,11-tridecatrien-1-oate, B.P. 155–160° C./0.01 mm. Hg (bath temperature).

Example 5

Preparation of ethyl 5-oxa-3,8,12-trimethyl-12-chloro-2-tridecen-1-oate: A solution of 200 mg. of ethyl 5-oxa-3,8,12-trimethyl-2,11-tridecadien-1-oate (for its preparation see Example 2) in ethanol (3 ml.) is saturated under cooling with dry gaseous hydrogen chloride and then poured onto ice. The product is extracted with ether, the extract washed with an aqueous solution of sodium hydrogen carbonate and water until neutral, dried, and the ether evaporated at room temperature in vacuo. Yield, 200 mg. of ethyl 5-oxa-3,8,12-trimethyl-12-chloro-2-tridecen-1-oate which is sufficiently pure to not require any additional purification. The structure of the product was confirmed by elemental analysis and infrared spectrum. This procedure was used in the preparation of other esters of halogenated 5-oxaalkenoic acids (see the list hereinafter).

Example 6

Preparation of ethyl 5-oxa-3,8,12-trimethyl - 11,12-epoxy-2-tridecen-1-oate: Eethereal perphthalic acid (70 mg.) is added to a solution of ethyl 5-oxa-3,8,12-trimethyl-2,11-tridecadien-1-oate (100 mg.) in ether (3 ml.), the mixture is allowed to stand in an ice-box for 3 days, and then filtered to remove the phthalic acid. The filtrate is washed with an aqueous solution of sodium bicarbonate and water, and the ether is distilled off. Yield, 100 mg. of the crude, but almost pure epoxy derivative. It can be purified by chromatography over silica gel with the use of petroleum ether-ether (9:1), and by distillation at 125–130° C./0.01 mm. Hg. The diepoxy derivative (ethyl 5 - oxa - 3,8,12 - trimethyl-7,8,11,12-diepoxy-2-tridecen-1-oate) is prepared similarly but with the use of a double amount of perphthalic acid. For other epoxy derivatives prepared by this procedure see the list of compounds given hereinafter.

In addition to compounds the preparation of which is given in the above examples, a number of further compounds are analogously prepared with the use of ketone-ethers of Formula VI as intermediates such as those under column I and the procedures of Examples 2 to 10:

5-oxa-3,8,12-trimethyl-2-tridecen-1-oic acid; methyl, ethyl, benzyl and cyclohexyl 5-oxa-3,8,12-trimethyl-2-tridecen-1-oate;

methyl 5-oxa-3,8,12-trimethyl-2,11-tridecadien - 1 - oate, benzyl 5-oxa-3,8,12-trimethyl-2,11-tridecadien - 1 - oate and cyclohexyl 5-oxa-3,8,12-trimethyl-2,11-tridecadien-1-oate;

5-oxo-3,8,12-trimethyl-11,12-epoxy-2-tridecen-1-oic acid, methyl 5-oxa-3,8,12-trimethyl-11,12-epoxy-2 - tridecen-1-oate, benzyl 5-oxa-3,8,12-trimethyl-11,12-epoxy-2-tridecen-1-oate and cyclohexyl 5-oxa-3,8,12-trimethyl-11,12-epoxy-2-tridecen-1-oate;

5 - oxa - 3,8,12-trimethyl-12-chloro-2-tridecen-1-oic acid, methyl - 5-oxa-3,8,12-trimethyl-12-chloro-2-tridecen-1-oate, benzyl 5-oxa-3,8,12-trimethyl-12-chloro-2-tridecen-1-oate and cyclohexyl 5-oxa-3,8,12-trimethyl-12-chloro-2-tridecen-1-oate;

5-oxa-3,8,12-trimethyl - 2,7,11 - tridecatrien - 1 - oic acid, methyl 5-oxa-3,8,12-trimethyl - 2,7,11 - tridecatrien-1-oate, ethyl 5-oxa-3,8,12-trimethyl-2,7,11-tridecatrien-1-oate and cyclohexyl 5-oxa-3,8,12-trimethyl-2,7,11-tridecatrien-1-oate;

5 oxa-3,8,12-trimethyl-11,12-epoxy-2,7-tridecadien-1-oic acid, methyl 5-oxa-3,8,12-trimethyl-11,12-epoxy-2,7-tridecadien - 1 - oate, ethyl 5-oxa-3,8,12-trimethyl-11,12-epoxy-2,7-tridecadien - 1 - oate, benzyl 5-oxa-3,8,12-trimethyl-11,12-epoxy-2,7-tridecadien - 1 - oate and cyclohexyl 5-oxa-3,8,12-trimethyl-11,12-epoxy-2,7-tridecadien-1-oate;

5-oxa-3,8,12-trimethyl-7,8,11,12-diepoxy - 2 - tridecen-1-oic acid, methyl 5-oxa-3,8,12-trimethyl-7,8,11,12-diepoxy-2-tridecen - 1 - oate, benzyl 5-oxo-3,8,12-trimethyl-7,8,11,12-diepoxy-2-tridecen - 1 - oate and cyclohexyl 5-oxa-3,8,12-trimethyl-7,8,11,12-diepoxy - 2 - tridecen-1-oate;

5-oxa-3,8,12-trimethyl-8,12-dichloro - 2 - tridecen - 1 - oic acid, methyl 5-oxa-3,8,12-trimethyl-8,12-dichloro-2-tridecen-1-oate, ethyl 5-oxa-3,8,12-trimethyl-8,12-dichloro-2-tridecen-1-oate, benzyl 5-oxa-3,8,12-trimethyl-8,12-dichloro-2-tridecen-1-oate and cyclohexyl 5-oxa-3,8,12-trimethyl-8,12-dichloro-2-tridecen-1-oate;

5-oxa-3,8,12-trimethyl-2-tetradecen-1-oic acid, methyl 5-oxa-3,8,12-trimethyl-2-tetradecen - 1 - oate and ethyl 5-oxa-3,8,12-trimethyl-2-tetradecen-1-oate;

5-oxa-3,8,12-trimethyl - 2,11 - tetradecadien - 1 - oic acid, methyl 5-oxa-3,8,12-trimethyl-2,11-tetradecadien-1-oate and ethyl 5-oxa-3,8,12-trimethyl-2,11-tetradecadien-1-oate;

5-oxa-3,8,12-trimethyl-11,12-epoxy-2 - tetradecen - 1 - oic acid, methyl 5-oxa-3,8,12-trimethyl-11,12-epoxy-2-tetradecen-1-oate and ethyl 5-oxa-3,8,12-trimethyl-11,12-epoxy-2-tetradecen-1-oate;

5-oxa-3,8,12-trimethyl-12-chloro - 2 - tetradecen - 1 - oic acid, methyl 5-oxa-3,8,12-trimethyl-12-chloro - 2 - tetradecen-1-oate and ethyl 5-oxa-3,8,12-trimethyl-12-chloro-2-tetradecen-1-oate;

5-oxa-3,8,12-trimethyl-2,7,11-tetradecatrien - 1 - oic acid, methyl 5-oxa-3,8,12-trimethyl - 2,7,11 - tetradecatrien- 1-oate and ethyl 5-oxa-3,8,12-trimethyl - 2,7,11 - tetradecatrien-1-oate;

5-oxa-3,8,12-trimethyl-11,12-epoxy - 2,7 - tetradecadien-1-oic acid, methyl 5-oxa-3,8,12-trimethyl-11,12-epoxy-2,7-tetradecadien-1-oate and ethyl 5-oxa-3,8,12-trimethyl-11,12-epoxy-2,7-tetradecadien-1-oate;

5-oxa-3,8,12-trimethyl-8,12-dichloro-2-tetradecen - 1 - oic acid, methyl 5-oxa-3,8,12-trimethyl-8,12-dichloro-2-tetradecen-1-oate and ethyl 5-oxa-3,8,12-trimethyl-8,12-dichloro-2-tetradecen-1-oate;

5-oxa-3,8,12-trimethyl-2,12-tetradecadien-1-oic acid, methyl 5-oxa-3,8,12-trimethyl-2,12-tetradecadien-1-oate and ethyl 5 - oxa-3,8,12-trimethyl-2,12-tetradecadien-1-oate;

5-oxa-3,8,12-trimethyl-12,13-epoxy - 2 - tetradecen-1-oic acid, methyl 5-oxa-3,8,12-trimethyl-12,13-epoxy-2-tetradecen-1-oate and ethyl 5-oxa-3,8,12-trimethyl-12,13-epoxy-2-tetradecen-1-oate;

5-oxa-3,8,12-trimethyl-12,13-epoxy - 2,7 - tetradecadien-1-oic acid, methyl 5-oxa-3,8,12-trimethyl-12,13-epoxy-2,7-tetradecadien-1-oate and ethyl 5-oxa-3,8,12-trimethyl-12,13-epoxy-2,7-tetradecadien-1-oate;

5-oxa-3,8,12-trimethyl-2,7,12-tetradecatrien - 1 - oic acid, methyl 5-oxa-3,8,12-trimethyl - 2,7,12 - tetradecatrien-1-oate and ethyl 5-oxa-3,8,12-trimethyl-2,7,12-tetradecatrien-1-oate;

5-oxa-3,12-dimethyl-8-ethyl - 2 - tetradecen - 1 - oic acid, methyl 5-oxa-3,12-dimethyl-8-ethyl-2-tetradecen-1-oate and ethyl 5-oxa-3,12-dimethyl-8-ethyl - 2 - tetradecen-1-oate;

5-oxa-3,12-dimethyl-8-ethyl-2,11-tetradecadien-1-oic acid, methyl 5-oxa-3,12-dimethyl-8-ethyl-2,11-tetradecadien-1-oate and ethyl 5-oxa-3,12-dimethyl-8-ethyl-2,11-tetradecadien-1-oate;

5-oxa-3,12-dimethyl-8-ethyl-11,12-epoxy - 2 - tetradecen-1-oic acid, methyl 5-oxa-3,12-dimethyl-8-ethyl-11,12-epoxy-2-tetradecen-1-oate and ethyl 5-oxa-3,12-dimethyl-8-ethyl-11,12-epoxy-2-tetradecen-1-oate;

5-oxa-3,12-dimethyl-8-ethyl-12-chloro - 2 - tetradecen-1-oic acid, methyl 5-oxa-3,12-dimethyl-8-ethyl-12-chloro-2-tetradecen - 1 - oate and ethyl 5-oxa-3,12-dimethyl-8-ethyl-12-chloro-2-tetradecen-1-oate;

5-oxa-3,12-dimethyl-8-ethyl-2,7,11-tetradecatrien - 1 - oic acid, methyl 5-oxa-3,12-dimethyl - 8 - ethyl-2,7,11-tetradecatrien-1-oate and ethyl 5-oxa-3,12-dimethyl-8-ethyl-2,7,11-tetradecatrien-1-oate;

5-oxa-3,12-dimethyl-8-ethyl-11,12-epoxy - 2,7 - tetradecadien-1-oic acid, methyl 5-oxa-3,12-dimethyl - 8 - ethyl-11,12-epoxy-2,7-tetradecadien-1-oate and ethyl 5-oxa-3,12-dimethyl-8-ethyl-11,12-epoxy - 2,7 - tetradecadien-1-oate;

5-oxa-3,12-dimethyl-8-ethyl-8,12-dichloro - 2 - tetradecen-1-oic acid, methyl 5-oxa-3,12-dimethyl-8-ethyl-8,12-dichloro-2-tetradecen-1-oate and ethyl 5-oxa-3,12-dimethyl-8-ethyl-8,12-dichloro-2-tetradecen-1-oate;

5-oxa-3,12-dimethyl-8-ethyl-2,12-tetradecadien-1-oic acid, methyl 5-oxa-3,12-dimethyl-8-ethyl-2,12-tetradecadien-1-oate and ethyl 5-oxa-3,12-dimethyl-8-ethyl-2,12-tetradecadien-1-oate;

5-oxa-3,12-dimethyl-8-ethyl-12,13-epoxy - 2 - tetradecen-1-oic acid, methyl 5-oxa-3,12-dimethyl-8-ethyl-12,13-epoxy-2-tetradecen-1-oate and ethyl 5-oxa-3,12-dimethyl-8-ethyl-12,13-epoxy-2-tetradecen-1-oate;

5-oxa-3,12-dimethyl-8-ethyl-2,7,12-tetradecatrien - 1 - oic acid, methyl 5-oxa-3,12-dimethyl - 8 - ethyl-2,7,12-tetradecatrien-1-oate and ethyl 5-oxa-3,12-dimethyl-8-ethyl-2,7,12-tetradecatrien-1-oate;

5-oxa-3,12-dimethyl-8-ethyl-12,13-epoxy - 2,7 - tetradecadien-1-oic acid, methyl 5-oxa-3,12-dimethyl - 8 - ethyl-12,13-epoxy-2,7-tetradecadien-1-oate and ethyl 5-oxa-3,12-dimethyl-8-ethyl-12,13-epoxy - 2,7 - tetradecadien-1-oate;

5-oxa-3,8,12,16-tetramethyl - 2 - heptadecen - 1 - oic acid, methyl 5-oxa-3,8,12,16-tetramethyl-2-heptadecen-1-oate and ethyl 5-oxa-3,8,12,16-tetramethyl - 2 - heptadecen-1-oate;

5-oxa-3,8,12,16-tetramethyl-2,7,15-heptadectrien - 1 - oic acid, methyl 5-oxa-3,8,12,16-tetramethyl-2,7,15-heptadectrien-1-oate and ethyl 5-oxa-3,8,12,16-tetramethyl-2,7,15-heptadectrien-1-oate;

5-oxa-3,8,12,16-tetramethyl - 2,7,11,15 - heptadecatetraen-1-oic acid, methyl 5-oxa-3,8,12,16-tetramethyl-2,7,11,15-heptadecatetraen-1-oate and ethyl 5-oxa-3,8,12,16-tetramethyl-2,7,11,15-heptadecatetraen-1-oate;

5-oxa-3,8,12,16-tetramethyl-15,16-epoxy - 2,7,11 - heptadecatrien-1-oic acid, methyl 5-oxa-3,8,12,16-tetramethyl-15,16-epoxy-2,7,11-heptadecatrien-1-oate and ethyl 5-oxa-3,8,12,16-tetramethyl-15,16-epoxy - 2,7,11 - heptadecatrien-1-oate;

5 - oxa - 3,8,12,16-tetramethyl-7,8;11,12;15,16-triepoxy-2-heptadecen - 1 - oic acid, methyl 5-oxa-3,8,12,16-tetramethyl-7,8,;11,12;15,16-triepoxy - 2 - heptadecen-1-oate, ethyl 5-oxa-3,8,12,16-tetramethyl-7,8,;11,12;15,16-triepoxy-2-heptadecen-1-oate and benzyl-5-oxa-3,8,12,16-tetramethyl - 7,8;11,12;15,16-triepoxy-2-heptadecen-1-oate;

5-oxa-3,8,12,16-tetramethyl-8,12,16 - trichloro - 2 - heptadecen-1-oic acid, methyl 5-oxa-3,8,12,16-tetramethyl-8,12,16-trichloro - 2 - heptadecen - 1 - oate, ethyl 5-oxa-3,8,12,16-tetramethyl-8,12,16-trichloro - 2 - heptadecen-1-oate and benzyl 5-oxa-3,8,12,16-tetramethyl-8,12,16-trichloro-2-heptadecen-1-oate;

5-oxa-8,12-dimethyl-3-ethyl-2-tridecen-1-oic acid, methyl 5-oxa-8,12-dimethyl-3-ethyl-2-tridecen-1-oate, ethyl 5-oxa-8,12-dimethyl-3-ethyl-2-tridecen-1-oate and benzyl 5-oxa-8,12-dimethyl-3-ethyl-2-tridecen-1-oate;

5-oxa-8,12-dimethyl-3-ethyl-2,11-tridecadien-1 - oic acid, methyl 5-oxa-8,12-dimethyl-3-ethyl - 2,11 - tridecadien-1-oate, ethyl 5-oxa-8,12-dimethyl - 3 - ethyl - 2,11 - tridecadien-1-oate and benzyl 5-oxa - 8,12 - dimethyl - 3 - ethyl-2,11-tridecadien-1-oate;

5-oxa-8,12-dimethyl-3-ethyl - 11,12 - epoxy - 2 - tridecen-1-oic acid, methyl 5-oxa-8,12-dimethyl-3-ethyl - 11,12 - epoxy-2-tridecen-1-oate, ethyl 5-oxa-8,12 - dimethyl-3-ethyl-11,12-epoxy-2-tridecen-1-oate and benzyl 5 - oxa 8,12-dimethyl-3-ethyl-11,12-epoxy-2-tridecen - 1 - oate;

5-oxa-8,12-dimethyl-3-ethyl-12-chloro-2-tridecen - 1 - oic acid, methyl 5-oxa-8,12-dimethyl-3-ethyl - 12 - chloro-2-tridecen-1-oate, ethyl 5-oxa-8,12-dimethyl - 3 - ethyl-12-chloro-2-tridecen-1-oate and benzyl 5 - oxa - 8,12-dimethyl-3-ethyl-12-chloro-2-tridecen-1-oate;

5-oxa-8,12-dimethyl-3-ethyl-2,7,11 - tridecatrien - 1 - oic acid, methyl 5-oxa-8,12-dimethyl-3-ethyl - 2,7,11 - tridecatrien-1-oate, ethyl 5-oxa-8,12-dimethyl - 3 - ethyl-2,7,11-tridecatrien-1-oate and benzyl 5 - oxa - 8,12-dimethyl-3-ethyl-2,7,11-tridecatrien-1-oate;

5-oxa-8,12-dimethyl-3-ethyl-11,12 - epoxy - 2,7 - tridecadien-1-oic acid, methyl 5-oxa-8,12-dimethyl - 3 - ethyl-11,12-epoxy-2,7-tridecadien-1-oate;

5-oxa-8,12-dimethyl-3-ethyl - 7,8,11,12 - diepoxy - 2 - tridecen-1-oic acid, methyl 5-oxa-8,12-dimethyl - 3 - ethyl-7,8,11,12-diepoxy - 2 - tridecen - 1 - oate and ethyl 5-oxa-8,12-dimethyl-3-ethyl-7,8,11,12 - diepoxy - 2 - tridecen-1-oate;

5-oxa-8,12-dimethyl - 3 - ethyl - 8,12 - dichloro - 2 - tridecen-1-oic acid, methyl 5 - oxa - 8,12 - dimethyl - 3-ethyl-8,12-dichloro-2-tridecen-1-oate, ethyl 5-oxa - 8,12-dimethyl-3-ethyl-8,12-dichloro - 2 - tridecen - 1 - oate and benzyl 5-oxa-8,12 - dimethyl - 3 - ethyl - 8,12 - dichloro-2-tridecen-1-oate;

5-oxa-8,12-16-trimethyl-3 - ethyl - 2,7,11,15 - heptadecatetraen-1-oic acid, methyl 5-oxa - 8,12,16 - trimethyl - 3-ethyl-2,7,11,15-heptadecatetraen-1 - oate, ethyl 5 - oxa-8,12,16-trimethyl-3-ethyl-2,7,11,15 - heptadecatetraen-1-oate and benzyl 5-oxa-8,12,16-trimethyl - 3 - ethyl 2,7,11,15-heptadecatetraen-1-oate;

5-oxa-8,12-16-trimethyl-3 - ethyl - 15,16 - epoxy - 2,7,11-heptadecatrien-1-oic acid, methyl 5-oxa - 8,12,16 - trimethyl-3-ethyl-15,16-epoxy-2,7,11 - heptadecatrien - 1-oate and ethyl 5-oxa-8,12,16-trimethyl-3 - ethyl - 15,16-epoxy-2,7,11-trien-1-oate;

5-oxa-8,12,16-trimethyl - 3 - ethyl - 7,8;11,12;15,16 - triepoxy-2-heptadecen-1-oic acid, methyl 5-oxa - 8,12,16-trimethyl-3-ethyl-7,8;11,12;15,16 - triepoxy - 2 - heptadecen-1-oate and ethyl 5 - oxa - 8,12,16 - trimethyl - 3-ethyl-7,8;11,12;15,16-triepoxy-2-heptadecen-1-oate; and 5-oxa-8,12,16-trimethyl-3 - ethyl - 8,12,16 - trichloro - 2 - heptadecen-1-oic acid, methyl 5-oxa-8,12,16-trimethyl-3-ethyl-8,12,16-trichloro-2-heptadecen - 1 - oate, ethyl 5-oxa-8,12,16-trimethyl-3-ethyl - 8,12,16 - trichloro - 2-heptadecen-1-oate and benzyl 5-oxa-8,12,16-trimethyl-3-ethyl-8,12,16-trichloro-2-heptadecen-1-oate.

Example 7

Preparation of methyl 5-oxa-3,8,12 - trimethyl- 2 - tridecen-1-oate: Sodium methoxide in methanol is prepared from absolute methanol (5 ml.) and metallic sodium (0.46 g.; 0.02 gramatom) and added dropwise at room temperature to a solution of diethyl methoxycarbonylmethanephosphonate (4.2 g.; 0.02 mol) in dimethylformamide. The mixture is stirred in a nitrogen atmosphere for one hour and then treated with 4-oxa-7,11-dimethyldodecan-2-one (4.2 g.; 0.02 mol) in dimethylformamide (5 ml.) under cooling with water. When the spontaneous reaction is finished, the mixture is heated at 80° C. for six hours, poured onto ice, moderately acidified with acetic acid and extracted with ether. The ethereal layer is washed with an aqueous solution of sodium hydrogen carbonate and water till neutral and evaporated. The residual crude product is distilled at 112–116° C./0.01 mm. Hg. Yield, 4.5 g. of a mixture of cis- and trans- isomers of methyl 5-oxa-3,8,12-trimethyl - 2 - tridecen - 1 - oate; the isomers can be separated by chromatography on silica gel or gas chromatography.

Example 8

Preparation of ethyl 5-oxa-3,8,12-trimethyl - 2,11 - tridecadien-1-oate: Under exclusion of moisture and in an inert atmosphere, diethyl ethoxycarbonylmethanephosphonate (4.5 g.; 0.02 mol) is added dropwise to a stirred and cooled suspension of sodium hydride (0.48 g.; 0.02 mol) in dimethylcellosolve (40 ml.). When the spontaneous reaction is finished, the mixture is stirred for additional 1 hour and then treated dropwise with 4-oxa-7,11-dimethyl-10-dodecene-2-one (4.25 g.; 0.02 mol) at such a rate that the temperature does not exceed 30°. The mixture is allowed to stand for 1 hour and heated at 80° C. for 5–7 hours. The content of the flask is poured onto ice, moderately acidified with acetic acid, and extracted with ether. The organic layer is washed with an aqueous solution of sodium hydrogen carbonate and water, and the solvent is evaporated. The crude residue is distilled at 115–120° C./0.01 mm. Hg to afford a mixture (4.5 g.) of cis- and trans- isomers of ethyl 5-oxa-3,8,12-trimethyl-2,11-tridecadien-1-oate which may be purified by chromatography on silica gel.

The corresponding halo derivative is obtained by the action of dry hydrogen chloride on the ester dissolved in a solvent, e.g., ethanol. The hydrochlorinated solution is poured onto ice, extracted with ether, the ethereal extract washed with an equeous solution of sodium hydrogen carbonate and water till neutral, and dried. The ether is evaporated at room temperature in vacuo to yield ethyl 5-oxa-3,8,12-trimethyl - 12 - chloro - 2 - tridecen - 1 - oate which does not require any further purification. The same procedure may be used in the preparation of further esters of halogenated 5-oxaalkenoic acids of Formula I.

The corresponding epoxy derivative is prepared by the action of a suitable peracid, e.g., perphthalic acid, in a cold ethereal solution. The mixture is allowed to stand in a refrigerator for 3 days, filtered to remove phthalic acid, the filtrate washed with an equeous solution of sodium hydrogen carbonate and water until neutral, and then the ether is evaporated. The crude ethyl 5-oxa-3,8,12-trimethyl-11,12-epoxy-2-tridecen-1-oate can be purified by chromatography on silica gel with the use of petroleum ether—ether (9:1) as eluant or by distillation at 125–130° C./0.01 mm. Hg.

Example 9

Preparation of ethyl 5-oxa-3,12-dimethyl-8-ethyl-2,11-tetradecandien-1-oate: A mixture of 4-oxa-7-ethyl-11-methyl-10-tridecen-2-one (4.6 g.; 0.02 mol), absolute benzene (20 ml.), and activated powdered zinc (1.31 g.; 0.02 gramatom) is treated dropwise with ethyl bromoacetate (3.4 g.; 0.02 mol) at such a rate to keep a moderate reaction. The reaction mixture is then gently refluxed until all zinc dissolves, poured onto ice, acidified with sulfuric acid, and extracted with ether. The organic layer is washed with water and the solvent is evaporated. The residual crude hydroxy ester (6.0–6.2 g.) is added dropwise at room temperature into a stirred mixture of phosphorus oxychloride (3.3 g.; 0.02 mol), absolute pyridine (15 ml.), and absolute benzene (20 ml.). The whole is refluxed at 70–90° for 1–2 hours, poured onto ice, and the product is extracted with ether (30 ml.). The organic layer is washed with 5% aqueous sulfuric acid, an aqueous solution of sodium hydrogen carbonate, and water, and the solvent is evaporated. The crude residue is distilled at 125–130° C./0.01 mm. Hg to afford a mixture (3 g.) of cis- and trans- isomers of ethyl 5-oxa-3,12-dimethyl-8-ethyl-2,11-tetra-decadien-1-oate. The individual cis- and trans- isomers are obtained by chromatography on silica gel or gas chromatography. The minor reaction product, namely, ethyl 5-oxa-8-ethyl-3-methylene-12-methyl-11-tetradecen-1-oate, is separated by a combination of chromatography on silica gel and preparative gas chromatography.

Example 10

Preparation of methyl 5 - oxa - 3,8,12 - trimethyl - 2-tridecen-1-oate: A solution of 4-oxa-7,11-dimethyldodecan-2-one (4.3 g.; 0.02 mol) and methyl bromoacetate (3.4 g.; 0.022 mol) in absolute benzene (10 ml.) is added dropwise at such a rate to a suspension of activated powdered zinc (1.31 g.; 0.02 gramatom) in absolute benzene (10 ml.) to keep a moderate reaction. The reaction mixture is then refluxed until all zinc is dissolved. The mixture is poured onto ice, acidified with sulfuric acid, and the product is extracted with ether. The ethereal layer is washed with water, dried, and evaporated. The residual crude β-hydroxy ester (5.2 g.) is dehydarted as follows: The ester is added dropwise into a mixture of phosphorus oxychloride (3.3 g.), absolute pyridine (15 ml.), and absolute benzene (20 ml.). The whole is heated at 70–90° for 1.5 hours, poured onto ice, and the product is extracted with ether. The ethereal layer is washed with 5% aqueous sulfuric acid, an aqueous solution of sodium bicarbonate, and water, and evaporated. The residual crude ester is distilled at 115–120° C./0.01 mm. Hg to afford a mixture (2.7 g.) of isomeric methyl 5-oxa-3,8,12-trimethyl-2-tridecen-1-oate which is purified by chromatography on silica gel.

The biological activity of novel juvenile hormone analogues of the present invention was tested on several species belonging to different insect groups with the use of either topical assays effected by the method of a direct application of the test substance in one microliter of acetone to the body surface, or, by injection of the test substance in one microliter of olive oil into the insect body. The tests were performed on freshly molted last instar larvae of the hemipterans *Pyrrhocoris apterus, Dysdercus cingulatus, Graphosoma italicum, Lygaeus equestris*, as well as of the crickets *Gryllus bimaculatus*, freshly molted pupae of *Tenebrio molitor* and *Dermestes vulpinus*, and, larvae and pupae of *Galleria mellonella*.

The activity of test subtrances is expressed in ID-50 units indicating that amount of the test substance in micrograms per specimen which causes formation of half-larval (with Hemimetabola) or half-pupal (with Holometabola) adultoids, with the use of the above mentioned topical application or injections. The ID-50 units are derived from "dose-response" curves obtained by testing in several concentrations. It must be taken into consideration that doses many times lower than the ID-50 units shown may bring about the formation of imperfectly developed "partially juvenilized" specimens incapable of a further reproduction.

The following table indicates the hormonal activity of novel juvenile analogues on some selected insect species. It may be seen from the table that some test substances exhibit a relatively high activity on the hemipterans of the family Pyrrhocoris, namely, Pyrrhocoris and Dysdercus, some of which represent serious agricultural pests. The epoxide derivatives are active in less than one microgram amounts on the hemipterans of the family Pentatomidae (Graphosoma) which are otherwise considerably resistant to the action of other juvenile analogues. The epoxide derivatives are also active on serious agricultural pests of this family, namely, on *Eurygaster intergriceps* and some species of the genus Aelia which are serious grain pests.

As shown by our investigations, the novel ester according to the present invention represent a group of substances displaying a selective activity on certain insect species. As it may be seen from the table, the activity of test substances on holometabolic species is relatively low in comparison with that on the hemipterans. Assays with some of the novel test substances on larvae and pupae of the butterfly *Galleria mellonella* revealed their complete inactivity on this insect species. Consequently, it may be assumed that the novel esters could be used in practice preferably against the hemipterans of the above families and against selected insect species possessing a similar sensitivity to juvenile analogues.

The novel esters are also active as ovicides; the contact application to adult females of Pyrrhocoris causes sterility and inhibits the development of deposited eggs. Furthermore the novel esters cause the interruption of the imaginal diapause and thereby interfere with the insect developmental cycle. In lower doses, the novel esters cause deformations in the development of insect wings, i.e., in practice, the loss of the migratory ability.

Moreover, it has been found that some of the novel esters cause inhibition of metamorphosis with the parasitic hemipteran *Triatoma infestana* which transfer some diseases. This hemiperan is otherwise considerably resistant to juvenile analogues.

TABLE.—INSECT JUVENILE HORMONE ACTIVITY OF NOVEL ANALOGUES EXPRESSED IN ID-50 UNITS (MICROGRAMS PER SPECIMEN)

| Test substance | Insect/application | | | | | | | |
|---|---|---|---|---|---|---|---|---|
| | Pyrrhocoris apterus, topical | Dysdercus cingulatus, topical | Graphosoma italicum, topical | Lygaeus equestris, topical | Tenebrio molitor | | Dermestes maculatus | |
| | | | | | Inj. | Top. | Inj. | Top. |
| I | 1 | 0.5 | 50 | | >500 | >500 | | |
| II | 5 | 1 | 10 | 5 | >500 | >500 | | |
| III | 5 | 1 | 1 | | >500 | | | |
| IV | 0.08 | 0.01 | 0.8 | 0.1 | 1,000 | 500 | >1,000 | >1,000 |
| V | 1 | 0.3 | 0.8 | 3 | >1,000 | 500 | >1,000 | >1,000 |
| VI | 0.08 | | 5 | | 100 | | | |
| VII | 0.08 | | 50 | | >1,000 | >1,000 | | |

NOTE.—I=Ethyl 5-oxa-3,8,12-trimethyl-2-tridecen-1-oate; II=Ethyl 5-oxa-3,8,12-trimethyl-2,11-tridecadien-1-oate; III=Ethyl 5-oxa-3,8,12-trimethyl-2,7,11-tridecatrien-1-oate; IV=Ethyl 5-oxa-3,8,12-trimethyl-7,11-epoxy-2-tridecen-1-oate; V=Ethyl 5-oxa-3,8,12-trimethyl-11,12-epoxy-2,7-tridecadien-1-oate; VI=Ethyl 5-oxa-3,8,12-trimethyl-12-chloro-2-tridecen-1-oate; VII=Ethyl 5-oxa-3,8,12-trimethyl-8,12-dichloro-2-tridecen-1-oate.

What is claimed is:

1. A compound having the formula:

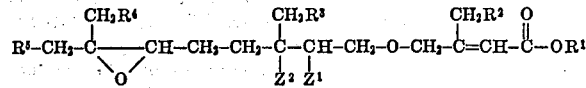

wherein,
each of $R^2$, $R^3$, $R^4$ and $R^5$ is hydrogen or methyl;
$R^1$ is lower alkyl;
$Z^1$ is hydrogen, when taken separately; and
$Z^2$ is hydrogen, when taken separately, or, taken with $Z^1$, a carbon-carbon bond.

2. A compound according to claim 1 and having the formula:

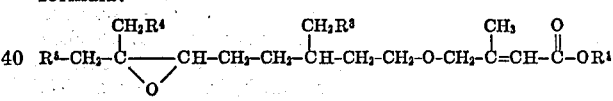

wherein
$R^2$, $R^3$, $R^4$, $R^5$ is hydrogen in methyl,
$R^1$ is methyl or ethyl.

3. A compound according to claim 2 and having the formula:

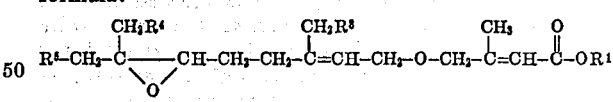

wherein:
$R^2$, $R^3$, $R^4$, $R^5$ is hydrogen in methyl,
$R^1$ is methyl or ethyl.

4. A compound according to claim 1 which is ethyl-5 - oxa - 3,8,12 - trimethyl - 11,12 - epoxy - 2 - tridecen-1-oate.

No references cited.

NORMA S. MILESTONE, Primary Examiner

U.S. Cl. X.R.

260—484 R, 594; 424—278, 314, DIG. 12